United States Patent [19]

Smith

[11] Patent Number: 5,077,910
[45] Date of Patent: Jan. 7, 1992

[54] CARPENTER'S MEASURING SQUARE

[76] Inventor: Peter T. Smith, P.O. Box 323, Peapack, N.J. 07977

[21] Appl. No.: 617,542

[22] Filed: Nov. 26, 1990

[51] Int. Cl.$^5$ ................................................ G01B 3/10
[52] U.S. Cl. .......................................... 33/760; 33/770
[58] Field of Search ................. 33/427, 759, 760, 768, 33/770, 769, 761, 429, 424, 474, 481, 451

[56] References Cited

U.S. PATENT DOCUMENTS

| | | | |
|---|---|---|---|
| 363,988 | 5/1887 | Carson | 33/451 |
| 733,302 | 7/1903 | Court | 33/761 X |
| 776,325 | 11/1904 | Hodge | 33/451 |
| 2,563,674 | 8/1951 | Coots | 33/761 X |
| 2,998,655 | 9/1961 | White | 33/451 X |
| 3,390,461 | 7/1968 | Anderson | 33/761 X |
| 4,967,482 | 11/1970 | Hoover et al. | 33/427 X |

FOREIGN PATENT DOCUMENTS

| | | | |
|---|---|---|---|
| 3415317 | 10/1985 | Fed. Rep. of Germany | 33/761 |
| 511868 | 1/1955 | Italy | 33/429 |
| 0218001 | 10/1985 | Japan | 33/765 |
| 146614 | 7/1920 | United Kingdom | 33/429 |

Primary Examiner—Harry N. Haroian
Attorney, Agent, or Firm—William T. Hough

[57] ABSTRACT

In a preferred embodiment, a carpenter's square with upright and laterally extending flat-bottomed straight edge members having a tape measure and its alternately extendable and retractable tape thereof having a bottom flat face, with the tape measure positioned and mounted on the upright and lateral extending members with its bottom flat face extending in the same plane or parallel to the plane as the flat bottoms of both the upright and laterally extending flat-bottomed members, with a window formed in a channeling structure through which any of the indicia on the tape may be viewed and aligned with a marker associated with the window which marker when aligned with an indicia indicates linear distance between the tapes extended end and the straight edge of the upright extending flat-bottomed straight edge member, there being a downwardly-extending flange extending from and mounted on the straight edge of the laterally extending straight edge member, and there being a leveling structure and mechanism thereon on the upwardly extending straight edge member, and there being an angle measuring member extending between outer portions of the upward and laterally extending straight edge members.

20 Claims, 2 Drawing Sheets

CARPENTER'S MEASURING SQUARE

This invention is directed to a carpenter's tool, namely a novel carpenter's measuring square device.

PRIOR ART

While superficially related prior art was located in a patentability search in United States Patent Office classification Class 7, subclass 164 thereof and Class 33, subclasses 760 and 342 thereof as follows, no relevant art was discovered overcoming prior problems and achieving novel benefits of the present invention. In each of the below-noted prior art patents, a flat-bottom of a tape extendable from a tape measure mounted on a square, extends with the tape's flat bottom "perpendicular" (vertical) relative to the plane in which the bottom surfaces of the squared-positioned upright and laterally-extending members of the square member, whereby the tape does not lie flat on a board surface on which the right-angle member's flat bottoms rest. Additionally, the prior art member combinations have no way of measuring up to precisely the straight-edge itself, as contrasted to the straight-edge other member on which the tape measure is mounted. Such patents located were Andrew U.S. Pat. No. Re. 27,496, Burroughs U.S. Pat. No. 1,323,742, Barbee U.S. Pat. No. 3,335,489, Larsen U.S. Pat. No. 4,438,538 and Vasile U.S. Pat. No. 4,700,489.

BACKGROUND TO THE INVENTION

Prior to the present invention, it has not been possible to extend a tape measure flatly along a surface on which a square is mounted, apart from separately measuring with a conventional tape measure flatly placed on the upper flat surface to be marked and subsequently cut, apart from first drawing squaring line by separate use of a carpenter's square placed flatly on the same surface.

For prior existing tape measure and carpenter's square combinations as set-forth in the preceding prior art statement, it has heretofore been impossible to extend a tape of a tape measure of those devices for the flat lower surface of the tape to be flatly placed on top of the article (board's) flat surface to be measured and/or marked while concurrently the square is flatly placed on the same article's flat surface, necessitating separate unrelated use of each of the tape measure and the squaring device, merely included in the same tool as an aggregation. In contrast thereto, the present invention is directed to a true interrelated combination with interrelated and interdependent functions, for concurrently using both the measure and the carpenter's square for their interrelated functions, including also the tape measure having read-outs of indicial indicative of exact distance from the end of the extended tape to the straight edge being measured from, even though the distance from the read-out point is not necessarily the same as the exact or correct measured distance indicated by the marker point of the present invention. In this background discussion, such is noted in the context of being impossible and not contemplated by the prior art, and yet being a needed interrelated function previously requiring separate and cumbersome and time-losing use of different separate tools. As a result thereof, much additional valuable time was heretofore repeatedly wasted and/or expended, which may now saved or reduced. Also, it was not as easy nor speedy to ascertain exact measurements, certainly not with the prior art combinations discussed above in the noted patents which could easily result in less accurate eventual markings. While the present invention achieves the benefit of combining different tools, namely a tape measure and a carpenter's square and the like, the preceding and following discussion makes it clear and conclusive that in the present invention the functions of the combination are made integral and interrelated to one-another, achieving new desirable results not heretofore available.

OBJECTS OF THE INVENTION

Accordingly, objects of the present invention include the overcoming and/or avoiding of problems and/or difficulties and/or disadvantages of the type(s) discussed above.

Another particular object is to obtain a novel carpenter's tool by which the carpenter's square may be concurrently placed face-down with an extending tape measure also place flatly down on the same surface while accurately indicating exact measurement to a straight edge of the square.

Another object is to achieve leveling as an integral interrelated part of measuring distance from a squared straight edge line, concurrently while the squaring straight edges and measuring tape are concurrently in measuring and aligning positions, for accurate read-outs on the leveling device.

Another object is to achieve preceding objects together with concurrently accomodating potential making of measurements from the same measured apex-point of the upwardly extending and the horizontally extending straight-edges.

Another object is to provide a handle structure facilitating stabilizing positions of both the square and the extended tape of the tape measure and/or the leveling device.

Other objects become apparent from the preceding and following disclosure.

BROAD DESCRIPTION

Broadly the invention may be described as a carpenter's measuring square device for facilitating pre-cut measuring and marking wood members, embodying interdependant and interrelated functions of the various elements of the combination, as follow. There is provided a carpenter's flat-faced square. The square includes a conventional upwardly-extending elongated first member having a first flattened underside extending between upper and lower ends thereof in a first plane and having a first upper side. Likewise, the square includes a conventional laterally extending elongated second member having a second flattened underside extending in the first plane with the second member. In the broad embodiment, the second member integrally and immovably and rigidly extends from the lower end of the first member with the second member's flattened underside laterally to a lateral position relative to the first member. The second member has a second upper side. A tape measure and mechanism for providing and including an extendable and retractable tape thereof. The tape has a lower flattened face and with an opposite upper face and with a distal extendable end. The tape measure and mechanism thereof provides for alternate extension and retraction along a lateral first direction. The tape measure structure(s) and mechanism thereof being rigidly and immovably mounted on and integral with at-least one and normally both of the first and second members and the tape thereof is extendable in the first direction in which the tape's lower flattened face when extended is in at-least one of a) the first plane and b) a second plane substantially parallel with the first plane. The upright first member has a first straight-edge extending conventionally upwardly linearly as an upright straight-edge extending in the second direction. The laterally extending second member has a second straight-edge extending conventionally laterally linearly as a horizontal straight edge extending laterally in the first direction. The tape has a first plurality of spaced-apart indicia ranging in the first direction on at-least one of the upper lower face(s) of the tape, with each of the first plurality being positioned to be indicative of its distance as measured from the first straight edge of the first member, to the distal extendable end. The tape measure structure(s) and mechanism thereof include(s) a tape guide structure—inclusive of the housing for storage of the retracted or partially-retracted tape. The tape guide structure (or preferably tape measure housing thereof) has marker structure(s) and mechanism thereof having at least one marker point with which any of the first plurality are alignable and matchable one at a time therewith. The one marker point is positioned to be indicative of a actual measured-distance between the distal extendable end and the upright straight edge. Because a proximal portion of the tape is always within the housing structure and/or channel structure connected therewith, the position of the indicia itself is not necessarily always the same as the correct above-noted measured distance indicated by the marker structure(s).

In a first preferred embodiment as an improvement on the above-described broad invention, the guide structure includes channel structure forming a closed channel having at least one open end through which the tape is extendable, the open end being connected by continuous through-space extending in the first direction and housing the tape. The channel structure has a window-forming structure forming a window positioned and adapted such that any one of the plurality is outwardly visibly discernible through the window when the viewable number is aligned with the marker point at the window.

In a second preferred embodiment as a further improvement on the first preferred embodiment, the inventive combination additionally includes at-least one downwardly-extending flange positioned along and extending downwardly from and rigidly affixed to the second straight edge.

In a third preferred embodiment as a further improvement on the second preferred embodiment, the inventive combination additionally include(s) an angle indicating structure(s) and mechanism thereof for ascertaining alternate acute angles of any of imaginary linear lines extending from an apex point at which the first and second straight-edges converge. More preferably, the angle indicating structure(s) and mechanism thereof is mounted on at least one of the first and second member to extend across actue angular space defined therebetween.

In an fourth preferred embodiment as further improvement on the third preferred embodiment, the inventive combination additionally includes leveling structure(s) and mechanism thereof mounted on at-least one of the first and second members, for ascertaining extent to which the first plane does or does not extend along or parallel to either or both of the first and second directions.

In a fifth preferred embodiment as a further improvement on the fourth preferred embodiment, the novel combination additionally includes a handle structure(s) and mechanism thereof mounted on at-least one of a) the tape measuring structure(s) and mechanism thereof and b) the second member, for sturdily and steadily holding the second member and the tape in an extended state onto a surface of an object to be cut, before or during measuring and marking thereof prior to cutting an object. More preferably, the handle or gripping structure is positioned on or above the laterally extending second member above-noted.

In a sixth preferred embodiment as a further improvement on the fifth preferred embodiment, the tape measure structure(s) and mechanism thereof include(s) a tape lock structure(s) and mechanism thereof for intermittently locking and unlocking any of adjustable degrees of alternate extension and retraction of the tape. The tape lock structure(s) and mechanism thereof provide(s) for stabilizing the tape against shifting prior to or during measuring and marking thereof prior to cutting an object.

In a seventh preferred embodiment as a further improvement on the sixth preferred embodiment, the tape measure structure(s) and mechanism thereof is/are mounted on each of the first and second members.

In an eighth preferred embodiment as an improvement on the broad invention above-noted, the above-noted guide structure includes channel structure forming a closed channel having the above-described open end connected by continuous through-space extending in the first direction and housing the tape, with the channel structure and its above-described window-forming structure forming the above-described window for seeing any one of the plurality as outwardly visibly discernible through the window when the viewable number is aligned with the marker point at the window as set-forth for the above-described third preferred embodiment.

In an nineth preferred embodiment as an improvement on the broad invention above-noted, there is included the improvement described for the above-described fifth preferred embodiment.

In a tenth preferred embodiment as an improvement on the broad invention above-noted, there is included the improvement described for the above-noted sixth preferred embodiment.

In an eleventh preferred embodiment as an improvement on the above-described broad invention, there is included the improvement described for the third preferred embodiment.

In a twelvth preferred embodiment as an improvement on the broad invention above-noted, there is additionally included the improvement of the above-described fourth preferred embodiment.

In a thirteenth preferred embodiment as an improvement on the broad invention previously described, there is included the improvement of the second preferred embodiment.

In a fourteenth preferred embodiment of the above-noted broad invention and on the eighth preferred embodiment, the window and marker associated therewith is/are a part of the housing structure that houses the retracted or partially retracted tape, and at-least a major proportion (for above-stated reason of some being within the housing even during total extension) of the plurality of indicia are on both sides of the tape, such that the underside indicia are viewable in the retracted portion of the tape within the housing by viewing through the window above described.

In a fifteenth preferred embodiment, there is included a further improvement on the second preferred embodiment, the further improvment being described in the preceding fourteenth preferred embodiment.

The invention may be better understood by making reference to the drawings of the following figures.

THE FIGURES

FIG. 1 diagrammatically illustrates a top plan view of a preferred embodiment of this invention.

FIG. 2 diagrammatically illustrates a side view of the FIG. 1 preferred embodiment, as taken along line 2—2 thereof.

FIG. 3 diagrammatically illustrates a side view of the preferred embodiment of FIG. 2, as taken along line 3—3 thereof.

FIG. 4 diagrammatically illustrate the same embodiments of FIGS. 1, 2 and 3, in a cross-sectional view as taken along line 4—4 of FIG. 1.

DETAILED DESCRIPTION

Figure 1:
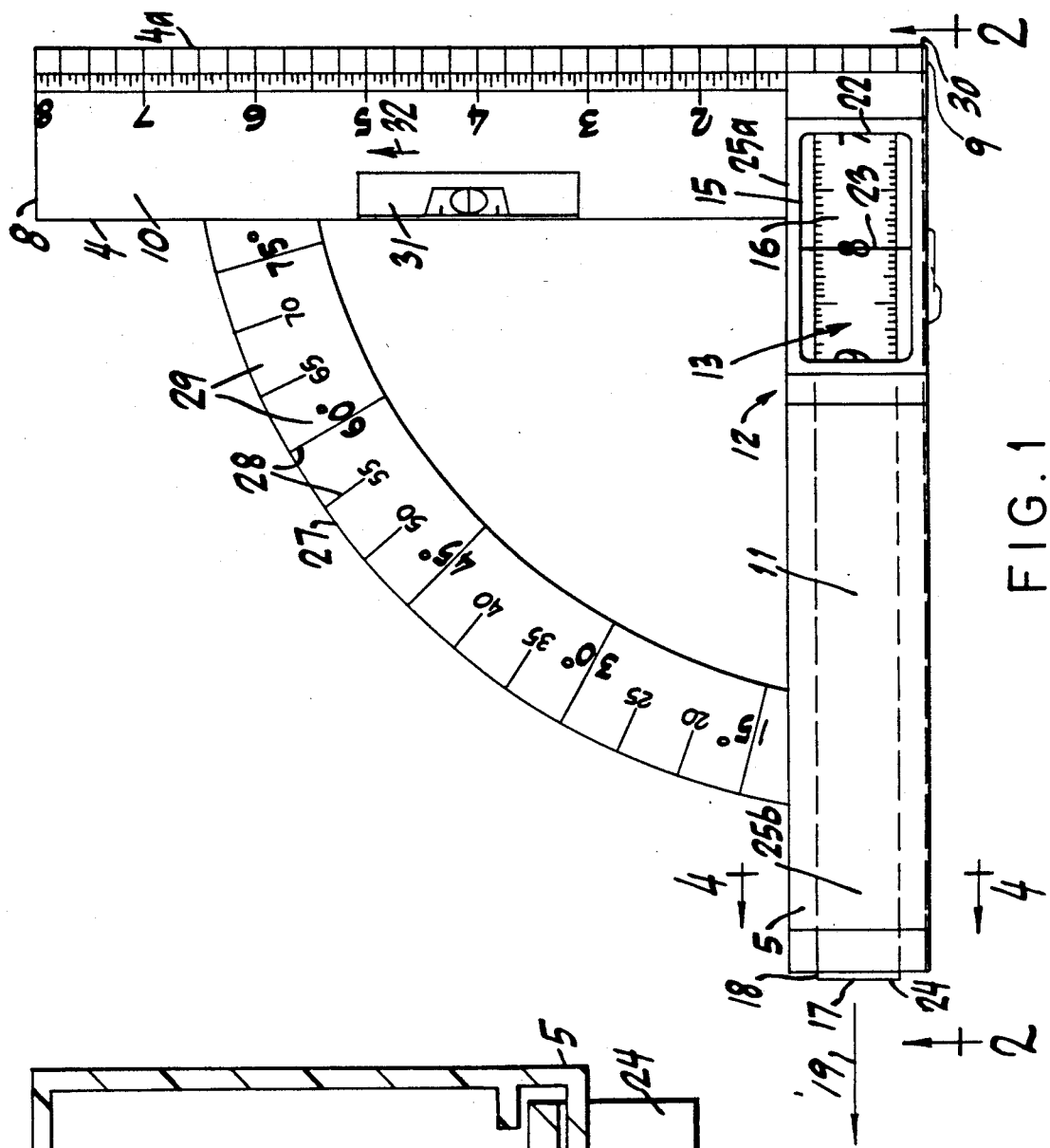
Figure 3:
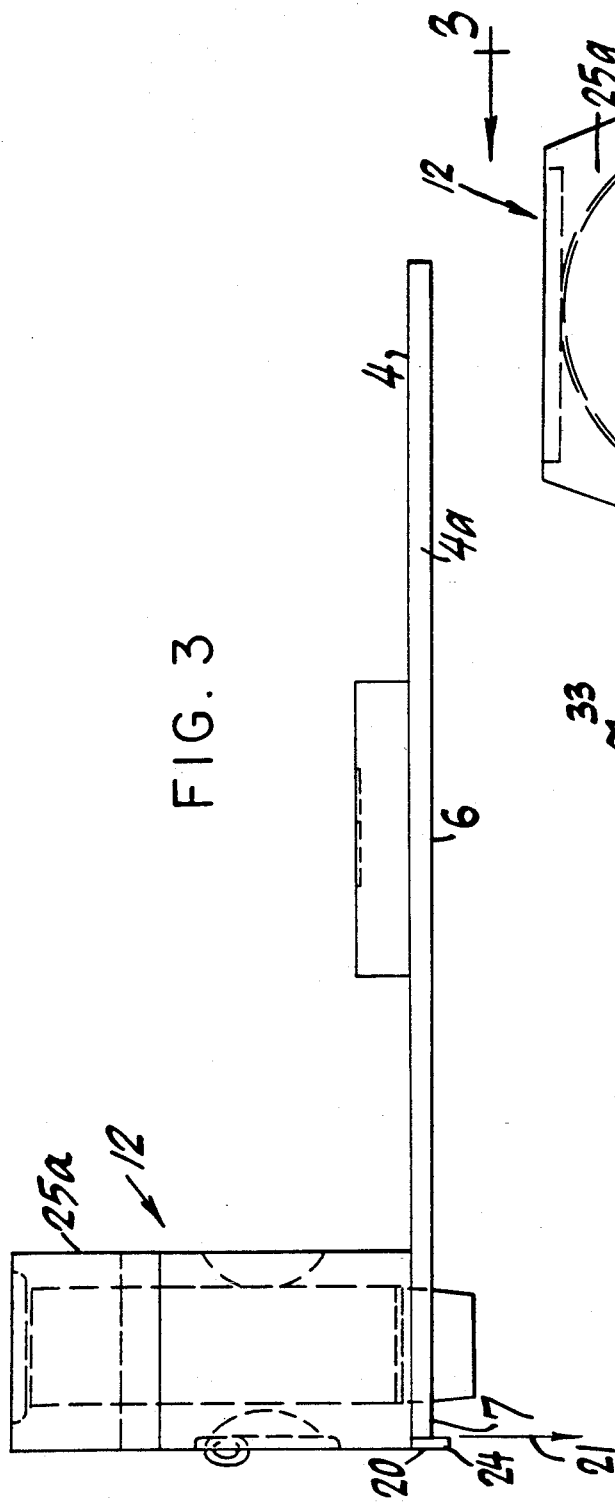
Figure 2:
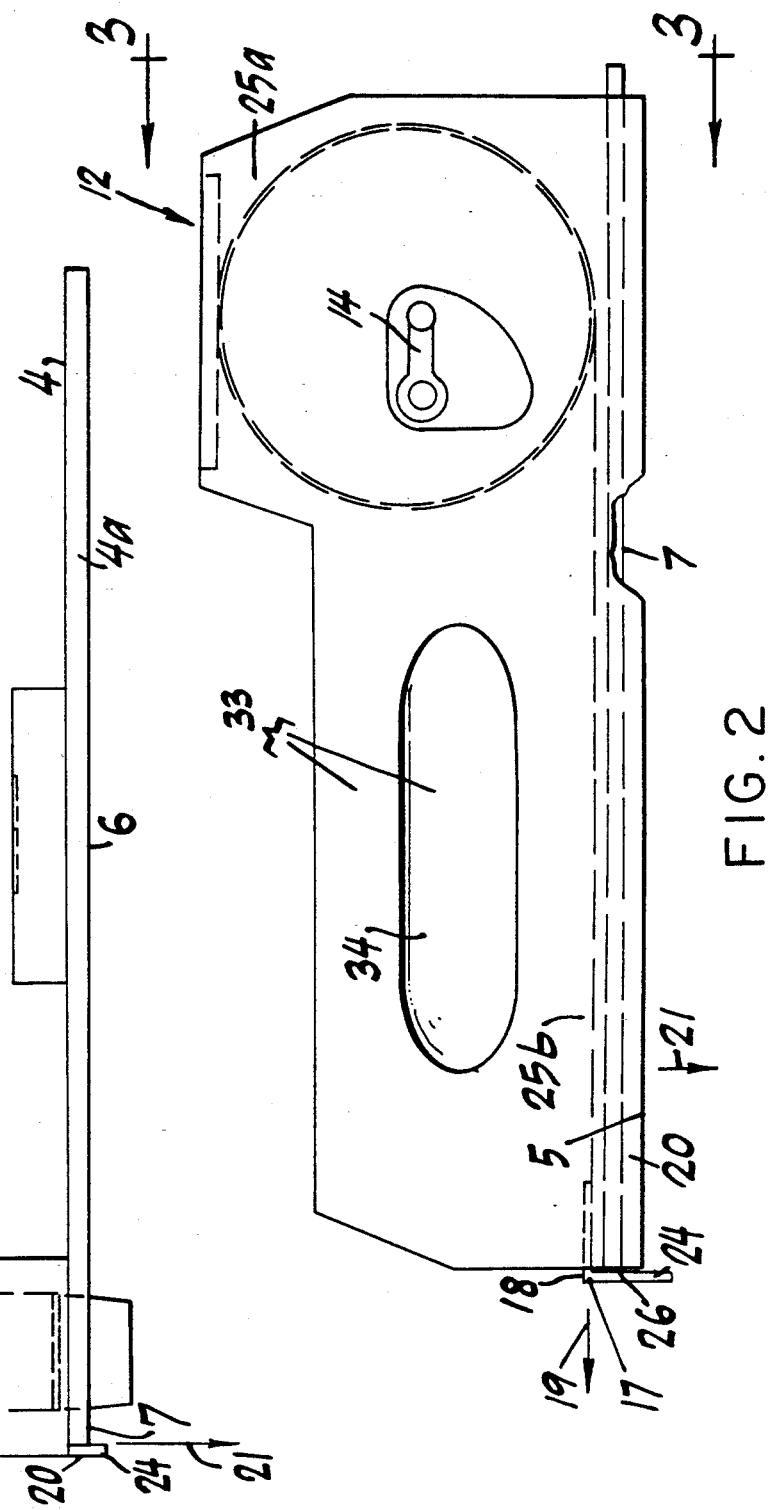

Each of FIGS. 1 through 3 illustrate a common preferred embodiment. Accordingly, for the different views thereof, common identical indicia are utilized. Once an element or feature of an indicia of one is described for one figure, description is not repeated for other figures except in some instances for purposes of improving clarity and understanding.

Figure 4:
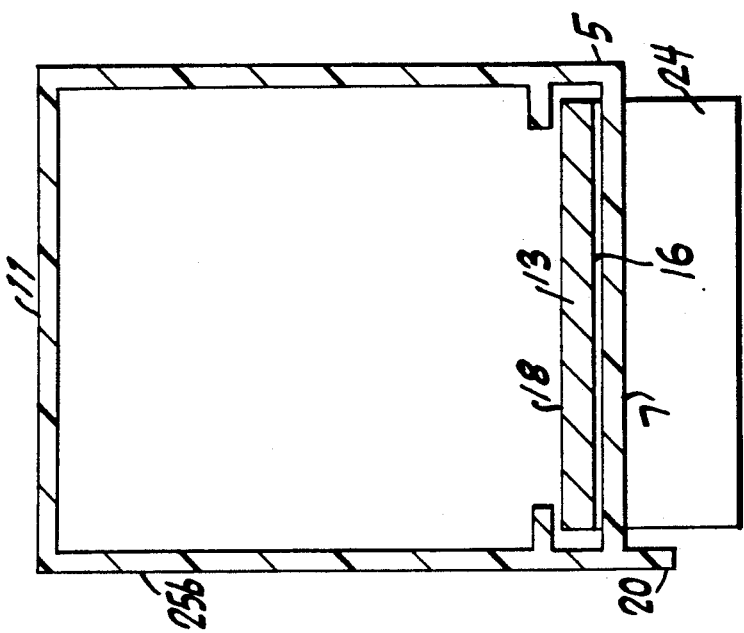

In FIGS. 1 and 3 there can be seen the upwardly-extending or upright first member 4 and in FIGS. 1, 2 and 4 there can be seen the horizontal second member 5. The upright first member 4 has a first flattened underside (or underface) 6 best viewable in FIG. 3. Viewable in FIGS. 1, 3 and 4 is the second flattened underside 7 of the horizontal second member. The first member's underside 6 extends between the upper end 8 and the lower end 9 thereof. The first member 4 extends along or in an imaginary first plane. The first member 4 has an upper side (or top or upper face) 10, best viewable in FIG. 1. Likewise, the second member 5 has an upper side (or top or upper face) 11 also illustrated in FIGS. 1 and 4. This square being thus-described has its first and second members rigidly and immovably attached as integral parts of a common square-structure as integral and immovable and rigidly one extending at right angle to the other, sharing a common corner, with the second member likewise extending in or along the common plane as the first member. Accordingly, in that common plane, the second member extends laterally as viewable best in FIG. 2, for the bottom or underside 7 above described. Mounted on and/or integral with typically the second member but also in this embodiment being integral also with the common end 9 above-described of the first member, is a tape measure structure and mechanism thereof—broadly referred to as structure 12, shown in all of FIGS. 1, 2 and 3. As with any conventional tape measure structure and mechanism, the present tape measure and mecahanism conventionally includes a tape housing with its enclosed tape 13 of FIG. 1 and conventional mechanism for extension and retraction, including conventional springs and release and intermittently locking mechanisms and structures thereof—not constituting a part of the inventive subject matter of the present invention and this embodiment thereof, but merely symbolically illustrating a conventional optional type tape-retraction crank 14 of FIGS. 1, 2 and 3. The tape 13 (FIGS. 1 and 4) has its lower face 16 (FIGS. 1 and 4) which is—in its stored retracted state—viewable through window 15 of FIG. 1 by which that portion of the retracted tape has become inverted, there is viewable the tape's bottom or lower flattened face 16 (FIGS. 1 and 4). The upper face thereof is partially viewable at the tape's extension-portion distal (extendable) end 17 as upper face 18 of FIGS. 1 and 4. The tape is extendable laterally in a first direction 19 (FIG. 1), and is retractable from an extended state in an opposite direction until in the position and state shown in the FIGS. 1 and 2. Along a forward side of the horizontal second member is an integrally and rigidly positioned straight-edge having (FIGS. 1, 3 and 4) extending as a flange 20 downwardly relative to and in a downward direction 21 (FIG. 1) perpendicular to each of the first and second planes above-described. On the lower face 16 of the tape 13 along a length of the tape are a series of space-apart indicia 22 viewable through the above-noted window 15, with the indicia being of numerical values in inches and being positioned to be accurately indicative of the distance from the distal end 17 to the above-noted first straight edge 4a as any particular indicia (or a definite point of location between two adjacent indicia 22) is aligned with the marker-line or member 23 fixedly and rigidly mounted in or across or a part of the window 16, as viewable in FIG. 1. The tape distal end 17 has as a rigidly and fixed part thereof a downwardly extending tape-flange 24 adapted to be hooked-over an edge of a board-end (for example) along the side which second straight edge is to be aligned when the first member is positioned at a predetermined desired distance from the board-end for a drawing of a squared linear line along the first straight edge 4a by a carpenter or other worker. The extendable and retractable tape measure structure and mechanism thereof above-noted includes the retracted-tape housing 25a and the permanently extended-tape portion housing 25b (all Figures), both housing portions 25a and 25b being conventionally shaped to include housing-space therein for the tape and for conventional springs, ratchet and/or the like conventionally housed in a conventsional tape measure—such mechanism not being the essence of the present invention, except to the extent that the housing portions 25a and 25b constitute tape guide structure for the aligned extension and retraction of the tape in direction 19 along the second plane in alignment with the second straight edge.

The angle indicating structure 27 is fixedly and rigidly attached to the first and second members primarily as a structural support extending between outer portions of those members, but as an added preferred feature includes thereon angle indicating marks 28 and accurately associated spaced-apart indicia 29 extending therealong indicative of acute angles relative to the second straight edge and relative to angles as measured around apex-point 30 located at the corner of the square, thus making the square adaptable for marking other points at which linear lines can be subsequently drawn to the apex point for subsequent cutting or sawing of the lumber or other piece being measured—the angle indicating structure and apex point and other above-described features being viewable as shown in FIG. 1.

As a further feature of squaring prior to the drawing of a cutting or sawing line along the first straight-edge, it is sometimes of utmost importance to simulteously ascertain that the lumber surface to be marked and cut is flatly leveled, to prevent potential uneven and inaccurate cuts that will not properly fit, whereby in a preferred embodiment there is included a fixed and rigidly mounted conventional level structure 31 (typically bubble-type) and mechanism thereof for leveling along direction 32, here (in this embodiment) being mounted on the first member 4 on its upper face 10.

The handle structure 33 and mechanism thereof is fixedly integral and rigid with both of the housing portions 25a and 25b, having a detent or indentation 34 (or a through-space hole) therein sufficiently for and arranged to allow hand-gripping by the carpenter or other worker, as best viewable in FIG. 2.

The tape retraction handle has a conventional type locking mechnism for preventing the tape from further extending or retraction, typically such as a conventional friction brake actuated by pressing downwardly (depressing) the lever/crank 14 to engage friction and/or for locking, and releasing by lifting the lever/crank to disengage friction and/or for unlocking and releasing the tape.

For the above-described invention, for various dimensions thereof, there are critical broad ranges beyond which the invention would be substantially inoperative in so far as diminished benefits of above-stated objects. Likewise there are critical narrow ranges that are essential in order to obtain preferred optimal results of the invention. Those ranges are as follow.

The first member broadly ranges in length between about 6 inches and about 24 inches in length, preferably between about 7 inches and 9 inches for the firsts linear edge with linearly-extending ruler and indicia thereof beginning at the apex point that is on the inward side of the second member's downwardly-extending flange as the second linear edge. Measurement to the outer edge of the second member's downwardly-extending flange increases that length measurement by the thickness of the downwardly-extending flange, typically by about 1/16 inch. The width of the first member 4 broadly ranges from about one inch to about three inches, the narrow range from about 1.2 inches to about two inches.

The second member ranges from about 6 inches and about 24 inches in its length, preferably about 7 inches to about 9 inches, as measured from the first straightedge. The width of the second member (not inclusive of the thickness of the downwardly-extending flange 20) broadly ranges from about one inch to about three inches, the narrow range from about 1.2 to about two inches.

The thickness of each of the first and second members 4 and 5 broadly ranges from about 1/32 inch to about ⅛ inch, the narrow range from about 1/32 inch to about 3/32 inch.

The flange 20 extends downwardly in directions 21 broadly from about ⅛ inch to about ¾ inch, narrowly from about 3/16 inch to about ⅜ inch.

In the use of the above-described inventive combination, a carpenter typically hooks the tape flange 24 over the far end of the piece or board to be cut, and by use of the handle positions the second straight-edge 20 along an elongated edge of the piece top be measured, marked and cut, and still using the gripping-handle, moves the first straight edge to a distance indicated by the mark alignment seen in the window, possibly then ascertaining leveling state of being, and thereafter marking with a pencil along the first straight edge.

It is within the scope and contemplation of this invention to make modifications/variations and/or substitution of equivalents within the skill of the ordinary artisan.

I claim:

1. A carpenter's measuring square device for facilitating pre-cut measuring and marking members having a linear edge, comprising in combination: a carpenter's flat-faced square including an upwardly-extending elongated first member having a first flattened underside extending between upper and lower ends thereof in a first plane and having a first upper side, and a laterally extending elongated second member having a second flattened underside extending in said first plane with the second member being immovably rigidly extending from the lower end of the first flattened underside laterally to a lateral position relative to the first member, the second member having a second upper side, and a tape measure means mounted rigidly and integrally on at least one of the first and second members, for providing and including a tape with a lower flattened face and with an opposite upper face and with a tape distal end extendable and retractable along a lateral first direction, the lower flattened face when extended being in at-least one of a) said first plane and b) a second plane substantially parallel with said first plane, the upright first member having a first straight-edge extending upwardly linearly as an upright straight edge extending in a second direction, the laterally extending second member having a second straight-edge extending laterally linearly as a horizontal straight edge extending laterally in said first direction, and the tape having a first plurality of spaced-apart indicia ranging in said first direction on at-least one of said lower face and said upper face, the tape measure means including a tape guide structure having marker means having at least one marker point with which at-least a perdetermined major proportion of said first plurality are alignable and matchable one at a time with said marker point with an aligned one of said first plurality equaling distance between said tape distal end and said upright straight edge when one of said plurality is aligned with said at least one marker point.

2. A carpenter's measuring square device of claim 1, in which the guide structure includes channel structure, the channel structure forming a tape housing and channel having an open end through which the tape extends, the channel having channel space extending in said first direction and continuous with said housing space, the channel structure having a window-forming structure forming a window positioned and adapted such that any one of said plurality is outwardly visibly discernible through said window when the viewable number is aligned with said marker point at said window.

3. A carpenter's measuring square device of claim 2, including at-least one downwardly-extending flange positioned along and extending downwardly from and rigidly affixed to said second straight edge.

4. A carpenter's measuring square device of claim 3, including an angle indicating means for ascertaining alternate acute angles of any of imaginary linear lines extending from an apex point at which said first and second straight-edges converge, the angle indicating means being mounted on at least one of said first and second member to extend across acute angular space defined therebetween.

5. A carpenter's measuring square device of claim 4, including leveling means mounted on at-least one of said first and second members, for ascertaining extent to which said first plane does or does not extend along or parallel to either or both of said first and second directions.

6. A carpenter's measuring square device of claim 5, including a handle means mounted on at-least one of a) said tape measuring means and b) said second member, for sturdily and steadily holding said second member and said tape in an extended state onto a surface of an object to be cut, before or during measuring and marking thereof prior to cutting an object.

7. A carpenter's measuring square device of claim 6, in which said tape measure means include a tape lock means for intermittently locking and unlocking an any of adjustable degrees of alternate extension and retraction of said tape, and the tape lock means providing for stabilizing the tape against shifting prior to or during measuring and marking thereof prior to cutting an object.

8. A carpenter's measuring square device of claim 7, in which said first and second members include a common corner as a common end, and in which said tape measure means is mounted on said common corner.

9. A carpenter's measuring square device of claim 1, in which the guide structure includes channel structure forming a closed channel having open ends connected by continuous through-space extending in said first direction and housing said tape and with the channel structure having a window-forming structure forming a window positioned and adapted such that any one of said plurality is outwardly visibly discernible through said window when the viewable number is aligned with said marker point at said window.

10. A carpenter's measuring square device of claim 1, including a handle means mounted on at-least one of a) said tape measuring means and b) said second member, for sturdily and steadily holding said second member and said tape in an extended state onto a surface of an object to be cut, before or during measuring and marking thereof prior to cutting an object.

11. Carpenter's measuring square device of claim 1, in which said tape measure means include a tape lock means for intermittently locking and unlocking an any of adjustable degrees of alternate extension and retraction of said tape, and the tape lock means providing for stabilizing the tape against shifting prior to or during measuring and marking thereof prior to cutting an object.

12. A carpenter's measuring square device of claim 1, including an angle indicating means for ascertaining alternate acute angles of any of imaginary linear lines extending from an apex point at which said first and second straight-edges converge, the angle indicating means being mounted on at least one of said first and second member to extend across acute angular space defined therebetween.

13. A carpenter's measuring square device of claim 1, including leveling means mounted on at-least one of said first and second members, for ascertaining extent to which said first plane does or does not extend along or parallel to either or both of said first and second directions.

14. A carpenter's measuring square device of claim 1, including at-least one downwardly-extending flange positioned along and extending downwardly from and rigidly affixed to said second straight edge.

15. A carpenter's measuring square device of claim 1, in which at-least a predetermined major proportion of said spaced-apart indicia are on each of said lower flattened face and said opposite upper face of said tape.

16. A carpenter's measuring square device of claim 3, in which at-least a predetermined major proportion of said spaced-apart indicia are on each of said lower flattened face and said opposite upper face of said tape.

17. A carpenter's measuring square device of claim 16, in which at-least a predetermined major proportion of said spaced-apart indicia are on said lower flattened face of said tape.

18. A carpenter's measuring square device of claim 1, in which at-least a predetermined major proportion of said spaced-apart indicia are on said lower flattened face of said tape.

19. A carpenter's measuring square device of claim 18, in which the first member ranges in length between about 7 inches and about 9 inches, width of the first member ranges from about 1.2 inches to about two inches and thickness of the first member ranges from about 1/32 inch to about 3/32 inch, and in which the second member ranges from about 7 inches and about 9 inches in its length and width from about 1.2 inch to about 2 inches and thickness from about 1/32 inch to about 3/32 inch.

20. A carpenter's measuring square device of claim 1, in which the first member ranges in length between about 7 inches and about 9 inches, width of the first member ranges from about 1.2 inches to about two inches and thickness of the first member ranges from about 1/32 inch to about 3/32 inch, and in which the second member ranges from about 7 inches and about 9 inches in its length and width from about 1.2 inch to about 2 inches and thickness from about 1/32 inch to about 3/32 inch.

* * * * *